United States Patent Office 3,384,686
Patented May 21, 1968

3,384,686
FLUOROCHLOROARYL PHOSPHATE ESTERS
Robert H. Boschan, Los Angeles, and James P. Holder, Woodland Hills, Calif., assignors, by mesne assignments, to McDonnell Douglas Corporation, Santa Monica, Calif., a corporation of Maryland
No Drawing. Filed Dec. 28, 1964, Ser. No. 421,706
11 Claims. (Cl. 260—966)

ABSTRACT OF THE DISCLOSURE

Triaryl phosphates of which the aryl groups include at least one monofluorinated aryl group and at least one monochlorinated aryl group, useful particularly at elevated temperatures as hydraulic fluids, lubricants and heat transfer or cooling media, for aircraft systems and for industrial use. Typical preferred compounds include m-fluorophenyl m-chlorophenyl phenyl phosphate and bis(m-fluorophenyl) m-chlorophenyl phosphate.

---

This invention relates to certain fluorochloro substituted triaryl phosphate esters and is particularly concerned with the provision of novel triaryl phosphates which are monofluorinated and monochlorinated on different aryl, e.g., phenyl, groups.

It is an object of the present invention to provide a series of compounds having high fire resistance, high temperature stability, and which remain in liquid form over a wide temperature range and are relatively non-volatile at elevated temperatures.

Another object of the invention is the provision of fluorochloro triaryl phosphate esters having the above-noted properties and other advantages, and having particular utility as hydraulic fluids, heat transfer fluids, and as lubricants.

Other objects and advantages will appear hereinafter.

We have discovered that the above-noted objects are achieved according to the invention by the provision of a class of fluorochloro phosphates having the formula

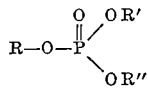

where R is monofluorophenyl, R' is monochlorophenyl and R" is a member selected from the group consisting of phenyl, cresyl, xylyl, monofluorophenyl and monochlorophenyl.

The fluorine and chlorine substituents each can be carried in ortho, meta or para position on the phenyl nucleus with respect to the attachment of such nucleus to the oxygen atom of the phosphate ester. However, the meta fluoro, meta chloro substitution is preferred since generally such derivatives have a wider liquid range and a lower melting point as compared to the corresponding para and ortho substituted fluoro and chloro derivatives.

According to the above general formula and as will be apparent hereinafter, the fluorochloro triaryl phosphate esters of the invention can include esters having from 1 to 2 monofluorophenyl groups and from 1 to 2 monochlorophenyl groups. Compounds having 2 monofluorophenyl groups are preferred over those containing 2 monochlorophenyl groups. One of the phenyl groups can remain unsubstituted and where a cresyl or xylyl group is present in the phosphate esters hereof, such groups are unsubstituted.

Thus, preferred phosphate esters according to the invention have the formula:

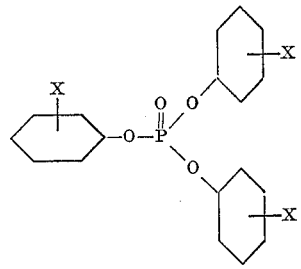

where X is a member selected from the group consisting of hydrogen, fluorine and chlorine, at least one X being fluorine and another X being chlorine, and said fluorine and chlorine atoms preferably being in meta position in the phenyl nuclei.

It has been found that the above-defined fluorochloroaryl, preferably fluorochloro triphenyl, phosphates are particularly valuable as functional fluids, e.g., as base stocks for hydraulic fluids, and are also useful as heat transfer media and as lubricants due to the advantageous physical properties of such compounds. These properties include high fire resistance, increased temperature stability, and liquidity over a relatively wide temperature range. Thus, for example, generally, these fluorinated phosphate esters have a thermal stability in the range of about 600 to about 800° F., autoignition temperatures of the order of about 900 to about 1,000° F., and remain liquid down to a temperature of the order of about —40° F., e.g., 0° F. to about —40° F. Further, the viscosity of such fluorochloro aryl phosphate esters at low temperatures of the order of about 0 to about —40° F. permits the operative use of such liquids as hydraulic fluids, cooling media and lubricants in these low temperature ranges. These compounds are also relatively non-volatile at elevated temperatures due to the high boiling point of these materials. Also, certain of the phosphate esters of the invention, particularly, the meta fluorophenyl meta chlorophenyl phosphate derivatives, have relatively low pour points, e.g., in the range of about —25° F. to about —50° F. or lower, which together with the relatively low viscosity of these materials at low temperatures, permits the liquid compounds to be pumped without high expenditure of energy at low temperatures. Moreover, the phosphate esters of the invention have good hydrolytic stability, and do not adversely affect materials, such as metals, e.g., steel, aluminum and the like, with which they may be in contact.

The above-noted properties render many of the fluorochloro aryl esters hereof, and especially the meta fluorophenyl meta chlorophenyl derivatives, particularly useful as hydraulic fluids, lubricants and cooling fluids in aircraft systems. especially modern high-speed aircraft systems.

Those fluorochloro aryl phosphate esters of the invention having melting points above 0° F., for example, those containing one or more fluorine or chlorine substituents in ortho and/or para position in the phenyl nucleus, can be employed as general industrial hydraulic fluids and lubricants, particularly where high fire resistance and high thermal stability are important characteristics, e.g., in high pressure systems such as hydroelectric turbines, air compressors and hydraulic presses having various sources of ignition which would result in fire and explosion from leaking hydraulic fluids in the event such fluids are not adequately fire resistant. Also, the relatively higher melting phosphate esters of the invention can be employed as additives in combination with compatible phosphate esters such as the m-fluorophenyl m-chlorophenyl derivatives hereof, or other phosphate esters such as the fluorinated diaryl phosphate esters of the copending application Ser. No. 364,763, filed May 4, 1964, of Seil et al., now Patent No. 3,308,207, to function as thickeners, lubricity improvers or pour point depressants for such esters, e.g., when the latter are employed as hydraulic fluid base stocks. When so employed as additives, the phosphate esters of the invention are used generally in a proportion of about 1 to about 10% by weight of the total composition.

The fluorochloro aryl phosphate esters of the invention can be produced by reacting a suitable phenol, monofluorophenol or monochlorophenol, or mixtures thereof, with a suitable, e.g., phenyl, monofluorophenyl or monochlorophenyl phosphoryl dichloride, or with a suitable halogenated diaryl, e.g., bis fluorophenyl or bis chlorophenyl, phosphoryl chloride, preferably in the presence of pyridine or any other suitable HCl acceptor. The proportion of HCl acceptor or pyridine generally employed is usually about equimolar with respect to the phenol or halogenated phenol employed. Where, for example, a phenyl or fluorophenyl or chlorophenyl phosphoryl dichloride is used, a proportion of about 2 moles of the phenol compound or compounds, to one mole of the phosphoryl dichloride is employed. Where, for example, a bis fluorophenyl or a bis chlorophenyl phosphoryl chloride is used, a proportion of about one mole of the phenol compound to one mole of the phosphoryl chloride is utilized. Monofluorophenyl phosphoryl dichlorides and bis (monofluorophenyl) phosphoryl chlorides are the subject of the invention of the copending application Ser. No. 421,641, filed of even date herewith, of Robert H. Boschan and James P. Holder, and the method of preparation of these compounds is described in such application.

The reaction is carried out generally by heating the reaction mixture including the phenol and the phosphoryl chloride compound, and which may also include an organic solvent, e.g., benzene, for a period of time, e.g., several hours, removing the organic phase containing the phosphate ester reaction product, preferably washing, and then drying such organic material, and distilling this material, usually at low pressure, to separate the phosphate ester present from excess phenol compound, and to remove water and any organic solvent present.

Specific examples of fluorochloro aryl phosphates of the invention are as follows:

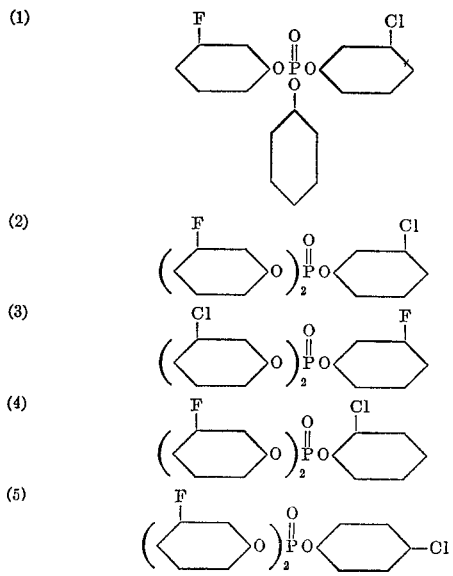

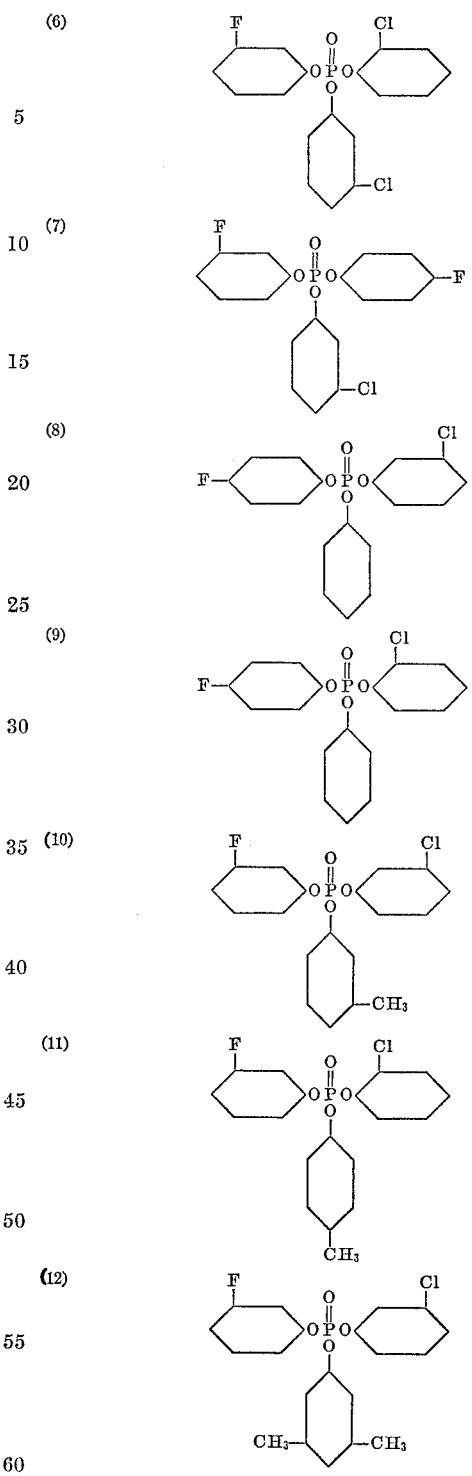

Some of the preferred compounds of the invention are Compounds 1 to 3 above. Such compounds possess a combination of viscosity characteristics, pour point, liquid range, thermal stability and lubricity, rendering such compounds particularly valuable as a hydraulic fluid, lubricant or cooling medium, especially suited for use in hydraulic systems of aircraft.

Example 1.—m-Fluorophenyl m-chlorophenyl phenyl phosphate

To a mixture of 35.3 g. (0.315 mole) of m-fluorophenol, 40.5 g. (0.315 mole) of m-chlorophenol, 52.2 g. (0.660 mole) of pyridine and 250 ml. of benzene was added dropwise with stirring 63.3 g. (0.300 mole) of phenyl phosphoryl dichloride. The temperature was maintained at 12–15° C. during the addition, which was complete in one hour and 20 minutes. The mixture was heated slowly to reflux and refluxed for 58½ hours.

The mixture was then cooled and poured into 400 ml. of water. The lower aqueous layer was withdrawn and extracted with three 100 ml. portions of ether. The ether extracts were added to the organic layer, which was then washed with 100 ml. of 5% hydrochloric acid, 100 ml. of 5% sodium bicarbonate and three 50 ml. portions of water. After drying over anhydrous magnesium sulfate, the solvents were removed by heating on a steam bath. The residue was then distilled at reduced pressure; the main product fraction, 97.4 g. (85.7% yield), distilled at 179–198° C. (0.28 mm. mercury).

*Analysis.*—Calculated for $C_{18}H_{13}ClFO_4P$: C, 57.09; H, 3.40; Cl, 9.36; F, 5.02; P, 8.18. Found: C, 57.56; H, 3.56; Cl, 8.94; F, 5.44; P, 8.28.

The resulting phosphate ester product, Compound 1 above, has a kinematic viscosity at 0° F. of 1,060 centistokes and a pour point of −45° F. The compound remains liquid over a broad temperature range. Such phosphate ester has a thermal stability up to about 634° F., high autoignition temperature, good hydrolytic stability and high fire resistance.

Such phosphate ester has particular utility as a hydraulic fluid or lubricant in an aircraft system.

Example 2.—Bis(m-fluorophenyl) m-chlorophenyl phosphate

To a mixture of 70.6 g. (0.63 mole) of m-fluorophenol, 52.2 g. (0.66 mole) of pyridine and 250 ml. of benzene was added dropwise with stirring 73.6 g. (0.33 mole) of m-chlorophenyl phosphoryl dichloride. The temperature was maintained at 15–20° C. during the addition, which was complete in one hour. The mixture was heated to reflux temperature and refluxed for 24 hours.

The mixture was then cooled and poured into 500 ml. of water. The upper organic layer was withdrawn and the aqueous layer was extracted with three 100 ml. portions of ether. The ether extracts were added to the organic layer, which was then washed with 100 ml. each of 5% hydrochloric acid and 5% sodium bicarbonate, and with three 50 ml. portions of water. After drying over anhydrous magnesium sulfate, the solvents were removed by heating on a steam bath. The residue was then distilled at reduced pressure; the main product fraction, 100.9 g. (84.8% yield) distilled at 170–172° C. (0.11–0.12 mm. mercury).

*Analysis.*—Calculated for $C_{18}H_{12}ClF_2O_4P$: C, 54.50; H, 3.05; Cl, 8.94; F, 9.58; P, 7.81. Found: C, 54.56; H, 3.15; Cl, 9.08; F, 8.73; P, 7.76.

The resulting product, consisting essentially of bis(m-fluorophenyl) m-chlorophenyl phosphate, compound (2) above, has a kinematic viscosity at 100° F. of 13.7 centistokes, a pour point of −35° F., and a thermal stability up to about 618° F. This phosphate ester has high autoignition temperature in the range of about 900 to about 1,000° F., good hydrolytic stability and high fire resistance. Such phosphate ester has a wide liquid range and is useful as a base stock component for a hydraulic fluid of an aircraft system, and as a lubricant.

Example 3.—Bis(m-chlorophenyl) m-fluorophenyl phosphate

To a mixture of 81.0 g. (0.630 mole) of m-chlorophenol, 52.2 g. (0.660 mole) of pyridine and 250 ml. of benzene was added dropwise with stirring 68.7 g. (0.300 mole) of m-fluorophenyl phosphoryl dichloride. The temperature was maintained at 15–20° C. during the addition, which was complete in one hour and 35 minutes. The mixture was heated to reflux temperature and refluxed for 19 hours.

The mixture was then cooled and poured into 500 ml. of water. The lower aqueous layer was withdrawn and extracted with three 100 ml. portions of ether. The ether extracts were added to the organic layer, which was then washed with 100 ml. of 5% hydrochloric acid, 100 ml. of 5% sodium bicarbonate, and three 50 ml. portions of water. After drying over anhydrous magnesium sulfate, the solvents were removed by heating on a steam bath. The residue was then distilled at reduced pressure; the main product fraction, 103.9 g. (83.8% yield), distilled at 187–192° C. (0.22 mm. mercury).

*Analysis.*—Calculated for $C_{18}H_{12}Cl_2FO_4P$: C, 52.33; H, 2.93; Cl, 17.16; F, 4.60; P, 7.50. Found: C, 53.08; H, 2.97; Cl, 16.89; F, 4.07; P, 7.62.

The product, consisting essentially of Compound 3 above, bis(m-chlorophenyl) m-fluorophenyl phosphate, has a kinematic viscosity at 100° F. of 19.2, a pour point of −15° F. and a thermal stability up to about 584° F. This phosphate ester has a high autoignition temperature, good hydrolytic stability and high fire resistance. Such phosphate ester, having a wide liquid range, is useful as a base stock for a hydraulic fluid of an aircraft system.

The table below shows a comparison of some of the physical properties of certain of the phosphate esters of the invention, Compounds 1 to 3, produced in Examples 1 to 3 above.

| Compound | Pour point, °F. | Thermal stability, °F. | Kinematic viscosity (centistokes) | | |
|---|---|---|---|---|---|
| | | | 0° F. | 100° F. | 210° F. |
| 1 | −45 | 634 | 1,060 | 28.3 | 13.90 |
| 2 | −35 | 618 | -------- | 13.7 | 2.77 |
| 3 | −15 | 584 | -------- | 19.2 | 3.26 |

The table above clearly shows the advantageous properties of the phosphate esters of the invention, particularly the m-fluorophenyl m-chlorophenyl phosphate esters hereof, with respect to pour point, viscosity and thermal stability, and clearly indicating a wide liquid range of such compounds rendering them useful as hydraulic fluids, lubricants and cooling media at temperatures below 0° F., as previously noted, as well as at elevated temperatures of the order of about 600 to about 800° F., due to their high thermal stability.

Example 4.—Bis(m-fluorophenyl) o-chlorophenyl phosphate

The procedure of Example 2 is substantially repeated employing 0.33 mole of o-chlorophenyl phosphoryl dichloride.

The product obtained, Compound 4 above, bis(m-fluorophenyl) o-chlorophenyl phosphate, can be employed as a hydraulic fluid and lubricant.

Example 5.—m-Fluorophenyl m-chlorophenyl p-cresyl phosphate

The procedure of Example 1 is essentially followed employing 0.31 mole of m-fluorophenol, 0.31 mole of meta cresol and 0.300 mole of m-chlorophenyl phosphoryl dichloride. The product obtained is Compound 10 above, m-fluorophenyl m-chlorophenyl m-cresyl phosphate.

Example 6

A mixture is prepared consisting of 90% by weight of Compound 3 of Example 3 above, and 10% by weight of Compound 10 of Example 5 above.

The resulting mixture has improved liquid range as compared to the separate components of such mixture.

Such mixture is effective as a hydraulic fluid and lubricant in aircraft systems.

Example 7

A mixture is prepared consisting of 95% by weight of 1,1,5-trihydroperfluoropentyl diphenyl phosphate and 5% by weight of Compound 10 above. The diphenyl phosphate ester above is described in the above copending application. The resulting mixture has improved lubricity and lower pour point as compared to the above diphenyl phosphate ester alone, and is useful as a hydraulic fluid of an aircraft system.

From the foregoing, it is seen that the invention provides a novel class of fluorochloro aryl, e.g., fluorophenyl chlorophenyl, phosphates, which are designed particularly for use as base stocks or base stock components or additives of hydraulic fluids, lubricants, and heat transfer or cooling media, for aircraft systems and for industrial use.

While we have described particular embodiments of our invention for the purpose of illustration, it should be understood that various modifications and adaptations thereof may be made within the spirit of the invention, as set forth in the appended claims.

We claim:

1. A phosphate ester having the formula

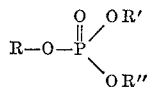

where R is monofluorophenyl, R' is monochlorophenyl and R" is a member selected from the group consisting of phenyl, cresyl, xylyl, monofluorophenyl and monochlorophenyl.

2. A phosphate ester as defined in claim 1, wherein R" is phenyl.

3. A phosphate ester as defined in claim 1, wherein R" is cresyl.

4. A phosphate ester as defined in claim 1, wherein R" is monofluorophenyl.

5. A phosphate ester as defined in claim 1, wherein R" is monochlorophenyl.

6. A phosphate ester as defined in claim 1, wherein said monofluorophenyl and monochlorophenyl groups are m-fluorophenyl and m-chlorophenyl groups, respectively.

7. A phosphate ester as defined in claim 1, wherein R is m-fluorophenyl, R' is m-chlorophenyl and R" is monofluorophenyl.

8. A phosphate ester as defined in claim 1, wherein R is m-fluorophenyl, R' is m-chlorophenyl and R" is monochlorophenyl.

9. m-Fluorophenyl m-chlorophenyl phenyl phosphate.

10. Bis(m-fluorophenyl) m-chlorophenyl phosphate.

11. Bis(m-chlorophenyl) m-fluorophenyl phosphate.

References Cited

UNITED STATES PATENTS

| | | | |
|---|---|---|---|
| 2,033,916 | 3/1936 | Bass | 260—966 |
| 2,727,058 | 12/1955 | Conly | 260—950 |
| 2,754,316 | 7/1956 | Conly | 260—955 |

CHARLES B. PARKER, *Primary Examiner.*

B. BILLIAN, A. H. SUTTO, *Assistant Examiners.*